United States Patent
Chou (10) Patent No.: US 7,461,266 B2
(45) Date of Patent: *Dec. 2, 2008

(54) STORAGE DEVICE AND METHOD FOR PROTECTING DATA STORED THEREIN

(75) Inventor: Bruce C. S. Chou, Hsin Chu (TW)

(73) Assignee: Egis Technology Inc., Hsinchu (TW)

( * ) Notice: Subject to any disclaimer, the term of this patent is extended or adjusted under 35 U.S.C. 154(b) by 369 days.

This patent is subject to a terminal disclaimer.

(21) Appl. No.: 11/332,167

(22) Filed: Jan. 17, 2006

(65) Prior Publication Data

US 2007/0079138 A1   Apr. 5, 2007

(30) Foreign Application Priority Data

Jan. 19, 2005   (TW) ............................. 94101590 A (51) Int. Cl.
   *G06F 21/00*   (2006.01)
(52) U.S. Cl. .................. 713/186; 713/187; 726/5; 726/27; 382/115; 382/124
(58) Field of Classification Search .................. 713/186, 713/187; 726/5, 27; 382/115, 124
See application file for complete search history.

(56) References Cited

U.S. PATENT DOCUMENTS

| | | | |
|---|---|---|---|
| 4,582,985 A | | 4/1986 | Lofberg |
| 5,053,608 A | * | 10/1991 | Senanayake ............... 235/380 |
| 5,229,764 A | * | 7/1993 | Matchett et al. ............ 340/5.52 |
| 5,280,398 A | | 1/1994 | Wade et al. |
| 5,623,552 A | * | 4/1997 | Lane ........................... 382/124 |
| 5,995,014 A | * | 11/1999 | DiMaria .................... 340/5.52 |
| 6,011,858 A | * | 1/2000 | Stock et al. ................ 382/115 |

(Continued)

FOREIGN PATENT DOCUMENTS

EP   EP-1 204 079 A1   5/2002

(Continued)

OTHER PUBLICATIONS

Federal Information Processing Standards Publication 190; "Guideline For The Use Of Advanced Authentication Technology Alternatives" (FIPS PUB 190); Sep. 28, 1994; pp. 1-79.*

*Primary Examiner*—Carl Colin
(74) *Attorney, Agent, or Firm*—Muncy, Geissler, Olds & Lowe, PLLC (57) ABSTRACT

A storage device and a method for protecting data stored therein. The storage device includes a host interface connected to a terminal host, a control module connected to the interface, and a biometrics sensor and a memory module both connected to the control module. The control module makes the host automatically run a suitable driver and a suitable application program. The host receives an instruction from a user through the driver and program and informs the control module to control the sensor to read and process to-be-recognized biometrics data of the user and extract to-be-recognized minutiae data. The host sends the to-be-recognized minutiae data back to the control module through the interface. The control module compares the to-be-recognized minutiae data with template minutiae data stored in the memory module, and enables a private block of the memory module to be accessed by the host according to a matching result.

12 Claims, 4 Drawing Sheets

U.S. PATENT DOCUMENTS

| | | | | |
|---|---|---|---|---|
| 6,167,517 | A * | 12/2000 | Gilchrist et al. | 713/186 |
| 6,208,264 | B1 * | 3/2001 | Bradney et al. | 340/5.2 |
| 6,213,403 | B1 | 4/2001 | Bates, III | |
| 6,572,014 | B1 * | 6/2003 | Lambert | 235/380 |
| 6,624,739 | B1 * | 9/2003 | Stobbe | 340/5.2 |
| 6,744,910 | B1 * | 6/2004 | McClurg et al. | 382/124 |
| 6,775,776 | B1 * | 8/2004 | Vogt et al. | 713/186 |
| 6,819,219 | B1 * | 11/2004 | Bolle et al. | 340/5.52 |
| 6,952,489 | B1 * | 10/2005 | Angelo et al. | 382/124 |
| 7,114,051 | B2 * | 9/2006 | Guu et al. | 711/173 |
| 7,197,168 | B2 * | 3/2007 | Russo | 382/125 |
| 7,274,807 | B2 * | 9/2007 | Hillhouse et al. | 382/124 |
| 7,277,562 | B2 * | 10/2007 | Zyzdryn | 382/124 |
| 2002/0097142 | A1 * | 7/2002 | Janiak et al. | 340/5.53 |
| 2003/0005337 | A1 | 1/2003 | Poo et al. | |
| 2004/0025031 | A1 * | 2/2004 | Ooi et al. | 713/186 |
| 2004/0044897 | A1 * | 3/2004 | Lim | 713/186 |
| 2004/0068669 | A1 * | 4/2004 | Uchida | 713/202 |
| 2004/0128520 | A1 * | 7/2004 | LaCous | 713/186 |
| 2004/0208348 | A1 * | 10/2004 | Baharav et al. | 382/124 |

FOREIGN PATENT DOCUMENTS

| | | |
|---|---|---|
| GB | 2 387 933 A | 10/2003 |
| TW | 408290 | 10/2000 |
| TW | 514845 | 12/2002 |
| TW | 529020 | 4/2003 |
| TW | 558686 | 10/2003 |
| WO | WO-02/42887 A2 | 5/2002 |

* cited by examiner

STORAGE DEVICE AND METHOD FOR PROTECTING DATA STORED THEREIN

BACKGROUND OF THE INVENTION

1. Field of the Invention

The invention relates to a storage device and a method of protecting data stored therein, and more particularly to a storage device having a fingerprint sensor and a method of protecting data therein. The invention also correlates to the patent applications to the some of the inventors: (a) U.S. patent application Ser. No. 10/998,722, filed on Nov. 30, 2004, and entitled "MEMORY STORAGE DEVICE WITH A FINGERPRINT SENSOR AND METHOD FOR PROTECTING THE DATA THEREIN"; and (b) U.S. patent application Ser. No. 11/115,212, filed on Apr. 27, 2005 and entitled "PORTABLE ENCRYPTED STORAGE DEVICE WITH BIOMETRIC IDENTIFICATION AND METHOD FOR PROTECTING THE DATA THEREIN".

2. Description of the Related Art

The conventional method for protecting the personal data is often achieved by way of password protection. However, using the password to protect the personal data is troublesome because the user tends to forget the password and the password may also be dangerously cracked. Hence, the biometrics identification methods based on the biometrics data particular to the personal, such as the fingerprint, voice, signature, and iris, have been gradually developed in order to provide the more complete and effective data protection methods. The advantages are that the biometrics feature is always kept on the user and the user does not need to memorize the feature, the biometrics feature cannot be stolen, and the fingerprint biometrics feature protection method is strict and very convenient.

Recently, owing to the invention of the chip-type fingerprint sensor, the miniaturized electrical product incorporated with the fingerprint identification device becomes the technology that can be implemented. The associated technology can be found in the following (c) to (f) patents.

Thus, novel personal applications, such as the portable electrical products with the fingerprint identification function, have been developed. The associated arts may be found in the following patent applications to the inventor of this patent: (c) U.S. patent application Ser. No. 10/403,052, filed on Apr. 1, 2003, entitled "CAPACITIVE FINGERPRINT SENSOR," and published on Oct. 9, 2003 as US20030190061A1; (d) U.S. patent application Ser. No. 10/434,833, filed on May 13, 2003, entitled "PRESSURE TYPE FINGERPRINT SENSOR FABRICATION METHOD," and published on Nov. 20, 2003 as 20030215976A1; (e) U.S. patent application Ser. No. 10/414,214, filed on Apr. 16, 2003, and entitled "THERMOELECTRIC SENSOR FOR FINGERPRINT THERMAL IMAGING"; and (f) U.S. patent application Ser. No. 10/638,371, filed on Aug. 12, 2003, and entitled "CAPACITIVE MICRO PRESSURE SENSING MEMBER AND FINGERPRINT SENSOR USING THE SAME". Thus, novel personal applications, such as the portable electrical products with the fingerprint identification function, have been developed.

More particularly, the aspect of the storage medium protection is an important development item incorporated with the biometrics identification method. For example, U.S. Pat. No. 4,582,985 issued on Apr. 15, 1986 has disclosed a method of protecting data stored in a storage medium, wherein personal data stored in a personal ID card device is protected by way of fingerprint identification. After the fingerprint identification procedure passes, the protected data stored in the card device can be outputted for the subsequent processing or identifying procedure. The transversal dimension of this device is the same as that of the general credit card. This device, which is a completely independent fingerprint identification device for performing the fingerprint acquiring and identifying procedures, mainly includes a fingerprint sensor, an image processing and identifying module, and a memory. Even if the device is applied to the prevent personal credit card from being counterfeited, this device has a high price. For example, the image processing and identifying module needs an advanced and expensive microprocessor, such as a 32-bit RISC (Reduced Instruction Set Computer) processor or a DSP (Digital Signal Processor) chip, in addition to the fingerprint sensor, so the independent identification device cannot be popularized easily.

U.S. Pat. No. 6,213,403, EP124079A1, WO 02/42887A2, US 2003/005337, and GB2387933 patents disclose independent fingerprint identification devices, which are similar to that of U.S. Pat. No. 4,582,985 but have different interfaces.

Heretofore, the prior arts have a common feature of providing an independent fingerprint identification device including a fingerprint sensor, and a fingerprint image processing and identification IC. Such a design is intuitive and easily implemented and there is no need to install the fingerprint application program in the terminal system and the convenience of plug-and-play function may be provided. However, the prior art devices have an important problem of the high price because a fingerprint image processing and identification IC and its associated memory components have to be utilized. Usually, the IC is the 32-bit RISC or DSP in order to perform the fingerprint identification effectively. Consequently, the conventional portable storage device with a fingerprint sensor has the drawback of high cost.

In order to solve the high cost problem, it is preferred to utilize the microprocessor of the terminal host to execute the fingerprint image processing and identification so as to reduce the cost effectively. However, the prior arts do not provide a definite solution.

If the fingerprint image processing and identification works are to be transferred from the storage device to the CPU of the terminal system, the disclosed device must have the functions of causing the fingerprint application program, which includes the fingerprint image processing, identification and encrypting/decrypting sub-programs, and a fingerprint matching program, to be automatically run or executed in the terminal system so as to achieve the plug-and-play function and facilitate the usage in any other terminal system. The above-mentioned prior arts, however, do not provide this solution.

Alternatively, as shown in U.S. Patent Publication Number 2003/005337, it is possible to install the fingerprint processing and identification programs in the terminal system. Such a design, however, disables the user from using the device over various terminal systems, or the user has to spend time to laboriously install the driver and application programs first in the terminal systems before using. The conventional method is to provide an optical disk for storing the drivers for the memory and the drivers for the fingerprint sensor of the storage device so that the user can install the suitable drivers and enable the storage device to be used. In this case, each time when the computer systems are firstly set, the user has to carry the portable storage device together with the optical disk so that he or she can use the storage device in other computer systems. Although it is possible to download the driver through the network, it is not a convenient way because some computers cannot connect to the network.

Consequently, the inventor of this invention discloses, in the above-mentioned (a) and (b) patents, a method of automatically running a fingerprint identification and application program in a terminal system, wherein the storage device is divided into several regions, and one of the regions is simulated into a CD-ROM such that the terminal system regards this region as a CD-ROM device. The fingerprint identification and application program stored in this region may be run automatically. Thus, the prior art problems of high cost and installing fingerprint identification software in the computer in advance can be solved.

In the above-mentioned patents (a) and (b), the fingerprint images are processed and compared in the terminal system. After the comparison passes, a special command is outputted to inform the storage device to open the read/write authority.

Such a design still has some drawbacks. If someone can intercept the special command in the terminal host, the security of the storage device will be cracked because no fingerprint matching has to be performed.

To extend the above-mentioned (a) and (b) patents, the inventor further provides a method of protecting stored data, in which the key of the terminal system for opening the storage device is from being intercepted.

SUMMARY OF THE INVENTION

It is therefore an object of the invention to provide a storage device and a method of protecting data stored therein, wherein the storage device is connected to a terminal host and can cooperate with the terminal host without increasing too much cost of the storage device.

Another object of the invention is to provide a storage device and a method of protecting data stored therein, wherein the storage device can hide a fingerprint sensor and a memory from a terminal host so as to simplify the method of controlling the terminal host.

Still another object of the invention is to provide a storage device and a method of protecting data therein, wherein the storage device can prevent the a special command of the terminal host for enabling the storage device from being intercepted.

To achieve the above-mentioned objects, the invention provides a storage device including a host interface connected to a terminal host, a control module connected to the interface, and a biometrics sensor and a memory module both connected to the control module. The control module makes the host automatically run a suitable driver and a suitable application program. The host receives an instruction from a user through the driver and program and informs the control module to control the sensor to read and process to-be-recognized biometrics data of the user and extract to-be-recognized minutiae data. The host sends the to-be-recognized minutiae data back to the control module through the interface. The control module compares the to-be-recognized minutiae data with template minutiae data stored in the memory module, and enables a private block of the memory module to be accessed by the host according to a matching result.

The invention also provides a method of protecting data stored in the storage device, wherein the minutiae data are compared in the control module such that the control module controls the enabled and disabled states of the memory module. Thus, it is possible to effectively prevent a special command of the terminal host for enabling the private block of the memory module from being intercepted.

DETAILED DESCRIPTION OF THE INVENTION

Figure 1:
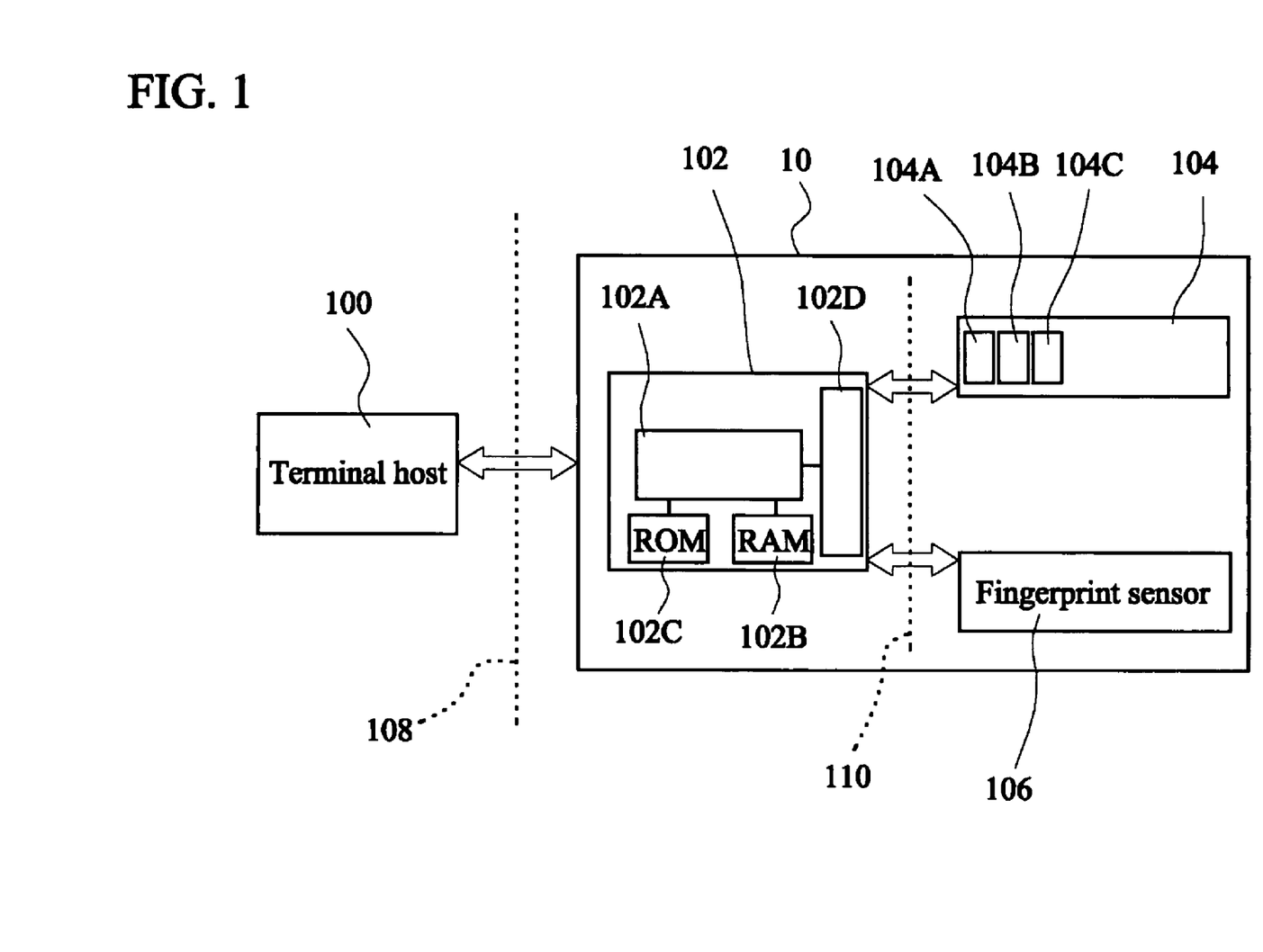
FIG. 1 is a schematic illustration showing a connection state between a terminal host and a storage device according to a first embodiment of the invention.

FIG. 1 is a functional block diagram showing a storage device 10 according to the first embodiment of the invention. The device 10 basically includes a control module 102, a memory module 104, a biometrics sensor 106 and a host interface 108. The biometrics sensor 106 can sense biometrics data of a user, such as the signature, the iris, the voice, the fingerprint or the like. In this embodiment, only the fingerprint sensor 106 is illustrated. The host interface 108 is a universal serial bus (USB) interface in this embodiment, and may be a PCMCIA interface, a PCI express interface, an IEEE 1394 interface or other standard interfaces in another embodiment. The host interface 108 is connected to a terminal host 100. The control module 102 is connected to the terminal host 100 through the host interface 108 and connected to the memory module 104 through a memory interface 110. The control module 102 functions to communicate with the terminal host 100 and manage the memory module 104 and the fingerprint sensor 106.

The control module 102 mainly includes a microprocessor 102A, a RAM 102B and a ROM 102C. The RAM 102B serves as a working memory for data processing. The ROM 102C stores firmware for enabling the storage device to work, as well as a program code for comparing fingerprint minutiae data. The microprocessor 102A, the RAM 102B and the ROM 102C may be integrated on a single chip. Alternatively, the control module 102 may further include a hardware encrypting/decrypting device 102D for encrypting/decrypting data inputted to or outputted from the memory module 104. The encrypting/decrypting device 102D may also be separated from the control module 102 and connected between the memory module 104 and the control module 102. The encrypting/decrypting device 102D, the microprocessor 102A, the RAM 102B and the ROM 102C may also be integrated in the single chip.

The memory module 104 has to include at least one storage chip or memory, such as a flash memory, a programmable read only memory (PROM), a read only memory (ROM) or an electrically erasable programmable read only memory (EEPROM), for storing data. The memory module 104 is divided into a public block 104A for storing at least one application program, a private block 104B for storing to-be-protected data, and a hidden block 104C for storing template minutiae data and an encrypting/decrypting key. The encrypting/decrypting key may further be transmitted to the encrypting/decrypting device 102D in order to encrypt/decrypt the to-be-protected data accessed from the private block 104B.

The fingerprint sensor 106 includes an area-type fingerprint sensor for sensing a fingerprint of a finger stationarily placed thereon, or a sweep-type fingerprint sensor for sensing a plurality of overlapped fingerprint fragment images of the finger sweeping thereacross. The fingerprint sensor 106 captures the fingerprint data (biometrics data) under the control of the control module 102, and transfers the fingerprint data to the terminal host 100 such that the terminal host 100 processes the fingerprint data by way of image processing including image enhancement and binary processing, extracts to-be-recognized minutiae data (or feature points), and then transfers the to-be-recognized minutiae data back to the microprocessor 102A in the control module 102. The to-be-recognized minutiae data and the original template minutiae data are compared. The so-called template minutiae data are the fingerprint data (biometrics data) generated when the owner of the storage device 10 firstly uses the device. The template minutiae data serve as a reference for the comparison of the subsequent fingerprint data. Thus, the fingerprint sensor 106 coupled to the control module 102 senses the template minutiae data of the authorized user as well as the to-be-recognized minutiae data of the user, which are then compared with the template minutiae data. In another example, the minutiae data can be random codes generated according to random code programs and the to-be-recognized fingerprint data and the template fingerprint data.

Figure 2:
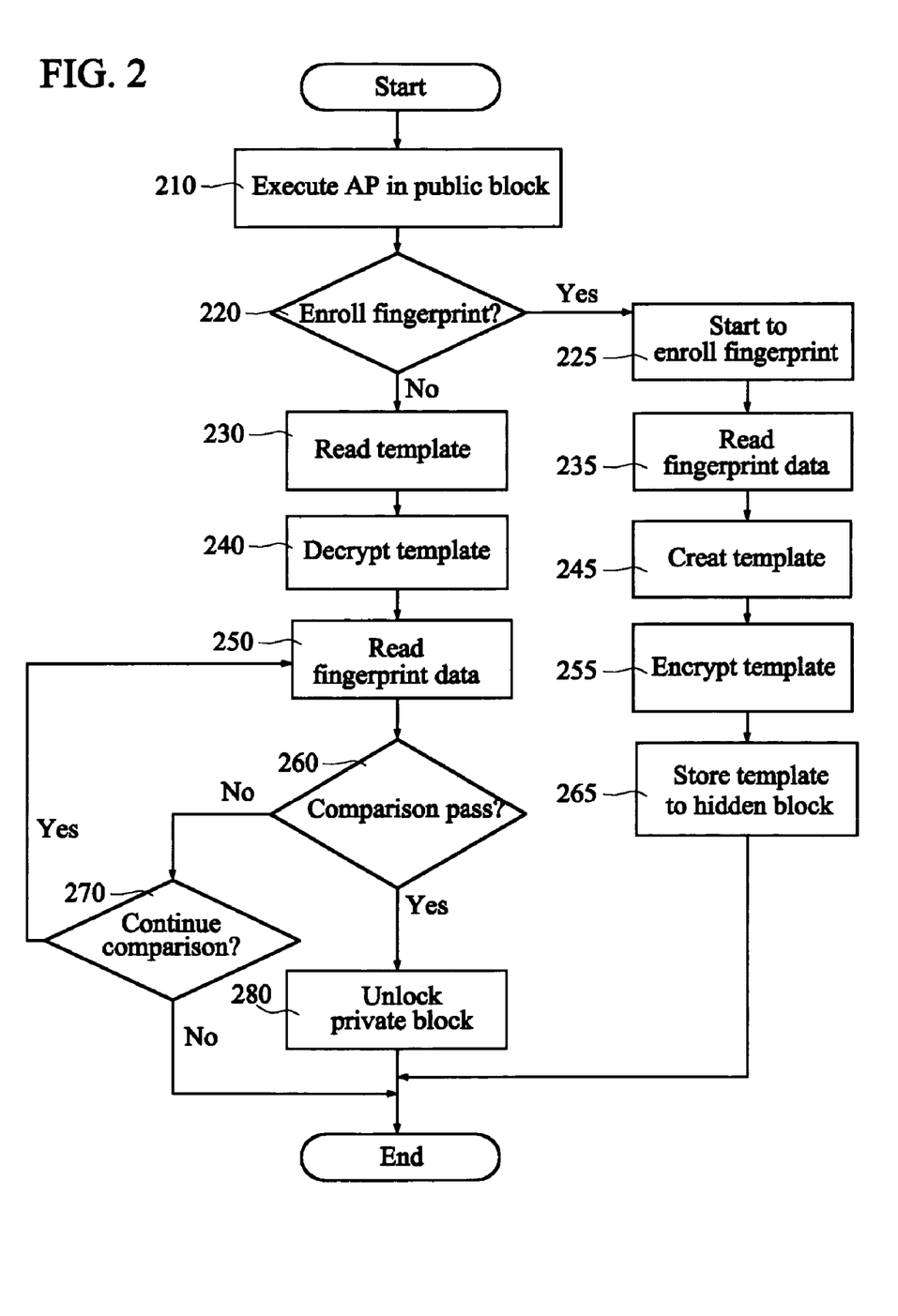
FIG. 2 is a flow chart showing a method of protecting data stored in the storage device having the fingerprint sensor.

As shown in FIG. 2, the method of protecting the data stored in the storage device 10 after the storage device 10 is connected to the terminal host 100 will be described in the following. First, the control module 102 communicates with the terminal host 100 through the host interface 108 and allocates the memory module 104 and regards the memory module 104 as a logic disk. Then, the control module 102 enables the terminal host 100 to automatically run one fingerprint application program stored in the public block or even automatically install a driver suitable for the operation for the terminal host 100, as shown in step 210. In one embodiment, the technology of enabling the operation system of the terminal host 100 to automatically download the driver and the fingerprint application program may be implemented by simulating the public block 104A of the memory module 104 as a CD-ROM booting area. Thereafter, in step 220, the terminal host 100 displays a window, which may be a pop-up window, for guiding the user to select to enter a fingerprint enrolling mode (step 225) or a fingerprint identification mode (step 230) or the terminal host 100 may automatically make a judgement to enter the fingerprint enrolling mode (step 225) or the fingerprint identification mode (step 230).

If the fingerprint enrolling mode is to be entered, the terminal host 100 informs the control module 102 to control the fingerprint sensor 106 to read the template fingerprint data of the authorized user, and transfers the template fingerprint data to the terminal host 100 (steps 235 and 245). At this time, the terminal host 100 processes the template fingerprint data to generate the template minutiae data using the fingerprint application program, and transmits the template minutiae data to the hidden block 104C for storage. Alternatively, the fingerprint application program may encrypt the template minutiae data according to a key (step 255). Then, the encrypted template minutiae data are transmitted to the hidden block 104C for storage (step 265).

If the fingerprint identification mode is to be entered, the microprocessor 102A of the control module 102 reads template minutiae data from the hidden block 104C (step 230), and then decrypts the template minutiae data according to a key (step 240). Next, the terminal host 100 informs the control module 102 to control the fingerprint sensor 106 to read the to-be-recognized fingerprint (biometrics) data of the user, and transfers the to-be-recognized fingerprint data to the terminal host 100 (step 250). Thereafter, the terminal host 100 processes the to-be-recognized fingerprint data to generate the to-be-recognized minutiae data using the application program, and transfers the to-be-recognized minutiae data back to the microprocessor 102A of the control module 102 such that the to-be-recognized minutiae data and the template minutiae data are compared to judge whether or not the to-be-recognized minutiae data substantially match with the template minutiae data (step 260). When the to-be-recognized minutiae data substantially match with the template minutiae data, the private block 104B is unlocked such that the terminal host 100 can access the private block (step 280). Otherwise, the private block 104B is disabled from being accessed by the terminal host 100, or the terminal host 100 asks the user whether he or she wants to try again for authentication (step 270).

Figure 3:
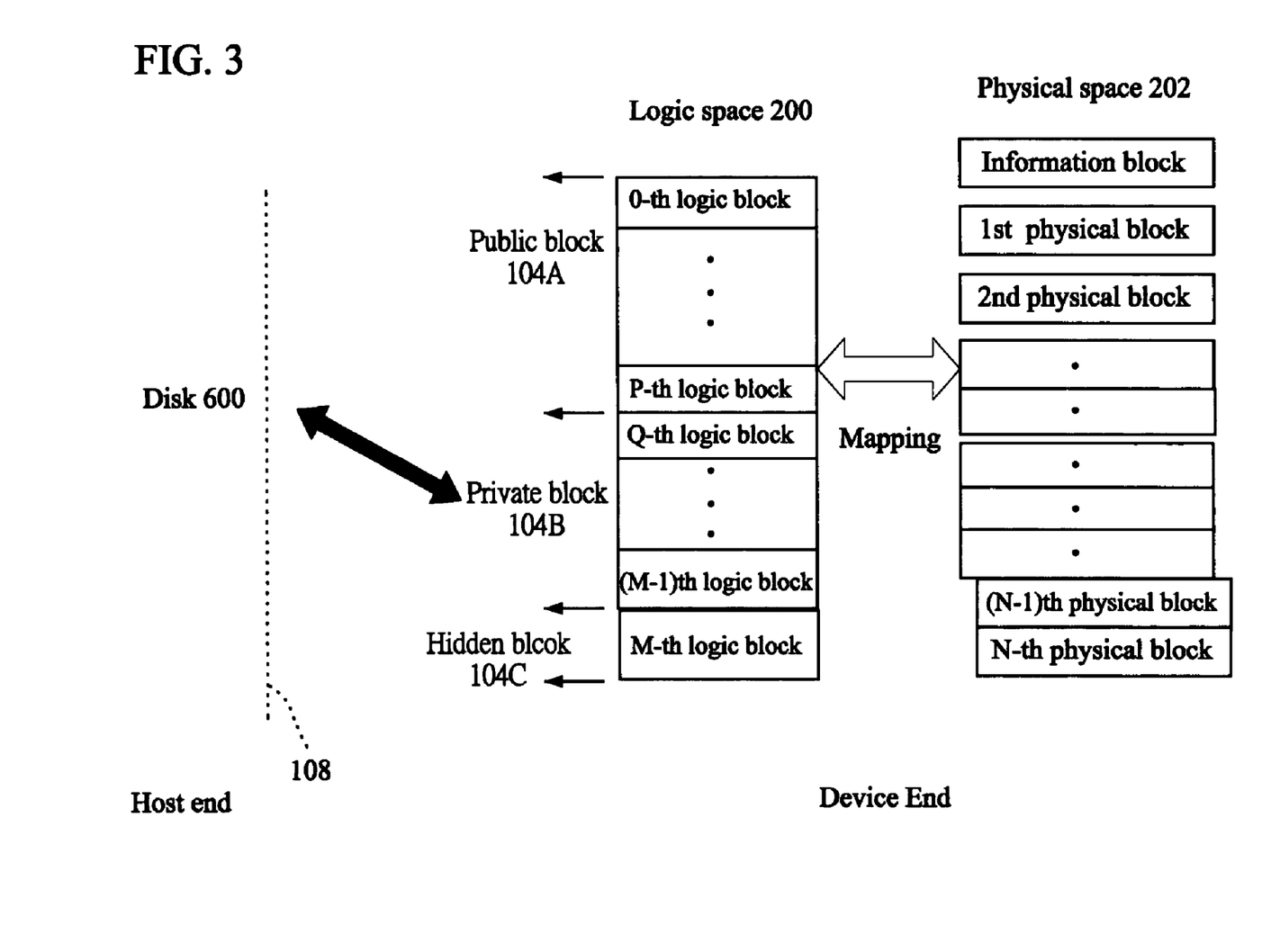
FIG. 3 is a schematic illustration showing a memory module of the device of the invention, which is divided into different independent regions.

The method of the control module 102 of the invention for managing the memory module 104 used in the device can divide the memory module into different independent blocks for storing different data. In this embodiment of the invention, the memory module 104 is divided into a public block 104A, a private block 104B and a hidden block 104C. As shown in FIG. 3, the memory module 104 of the invention device is divided into different independent regions. As shown in FIG. 3, the control module 102 of the storage device 10 of the invention cut a logic space 200 of the memory module 104 into three independent blocks including the public block 104A with 0-th to P-th logic blocks, the private block 104B with Q-th to (M-1)-th logic blocks, and the hidden block 104C with the M-th logic block. The dividing information is stored in a specific information block. The logic space 200 maps to a physical space 202, which includes 1st to N-th physical blocks of the information blocks.

In another embodiment, when the invention device is connected to the terminal host, the terminal host regards the device as an independent disk 600 and automatically links with the independent public block 104A in the memory module 104 so as to display options for the fingerprint application programs on the display device of the terminal host. Then, the user can select one of the fingerprint application programs such that a fingerprint enrolling frame appears, for example.

After the fingerprint front-processing application program of the public block 104A with operations, including image enhancing, binary processing, thinning and minutiae data extracting, has been performed and the minutiae data are transferred back to the microprocessor 102A of the control module 102 and the comparison passes, the terminal host automatically switches the public block 104A to the private block 104B. In addition, the minutiae data can be encrypted/decrypted by an encrypting/decrypting mechanism when they are transferred between the terminal host and the control module 102. Correspondingly, frame switching may appear on the display device of the terminal host. That is, the frame is switched to the protected private block 104B to show the protected data in the block, such that the user can freely access the protected data.

In brief, when the invention device is being used, the control module 102 firstly switches to the public block, automatically downloads the fingerprint front-processing application program, and transfers the minutiae data to the microprocessor 102A in the control module 102. After the comparison or matching successes, the terminal host switches to the private block. The mechanisms of automatically downloading and running the fingerprint front-processing application program, comparing the minutiae data in the microprocessor 102A of the control module 102 and the frame switching differentiate the invention device from the prior art device. In addition to the fingerprint front-processing of the microprocessor of the terminal host, which reduces the cost of the storage device, the function of automatically running the fingerprint application program in the terminal host is also included. Thus, the trouble of installing the fingerprint identification and application program in the terminal host in advance in the prior art, which is disadvantageous to the mobility and compatibility with other computers, may be avoided. The most important spirit of the invention is to design the minutiae data comparing function in the microprocessor 102A of the control module 102 without increasing any hardware cost. Thus, the storage device is free from be intercept and cracked, such that the real data confidentiality and security and the usage convenience can be achieved. Furthermore, the encrypting/decrypting device can prevent the data stored in the memory module 104 from being accessed after the memory module 104 is removed.

It is to be noted that the application programs in the public block of the invention are read only files and cannot be modified.

In this invention, a hidden block 104C may be additionally provided. This block communicates with the control module 102 directly through a special program, and the operation of the terminal host cannot find this block. The size of the hidden block 104C may be adjusted according to the design requirement. The hidden block stores private data such as the template minutiae data, encrypting keys and electric tokens. The size of the hidden block may also be set to be zero according to the requirement. In this case, the terminal host only displays the private block 104B and the public block 104A in the disk 600 mapping with this device.

Figure 4:
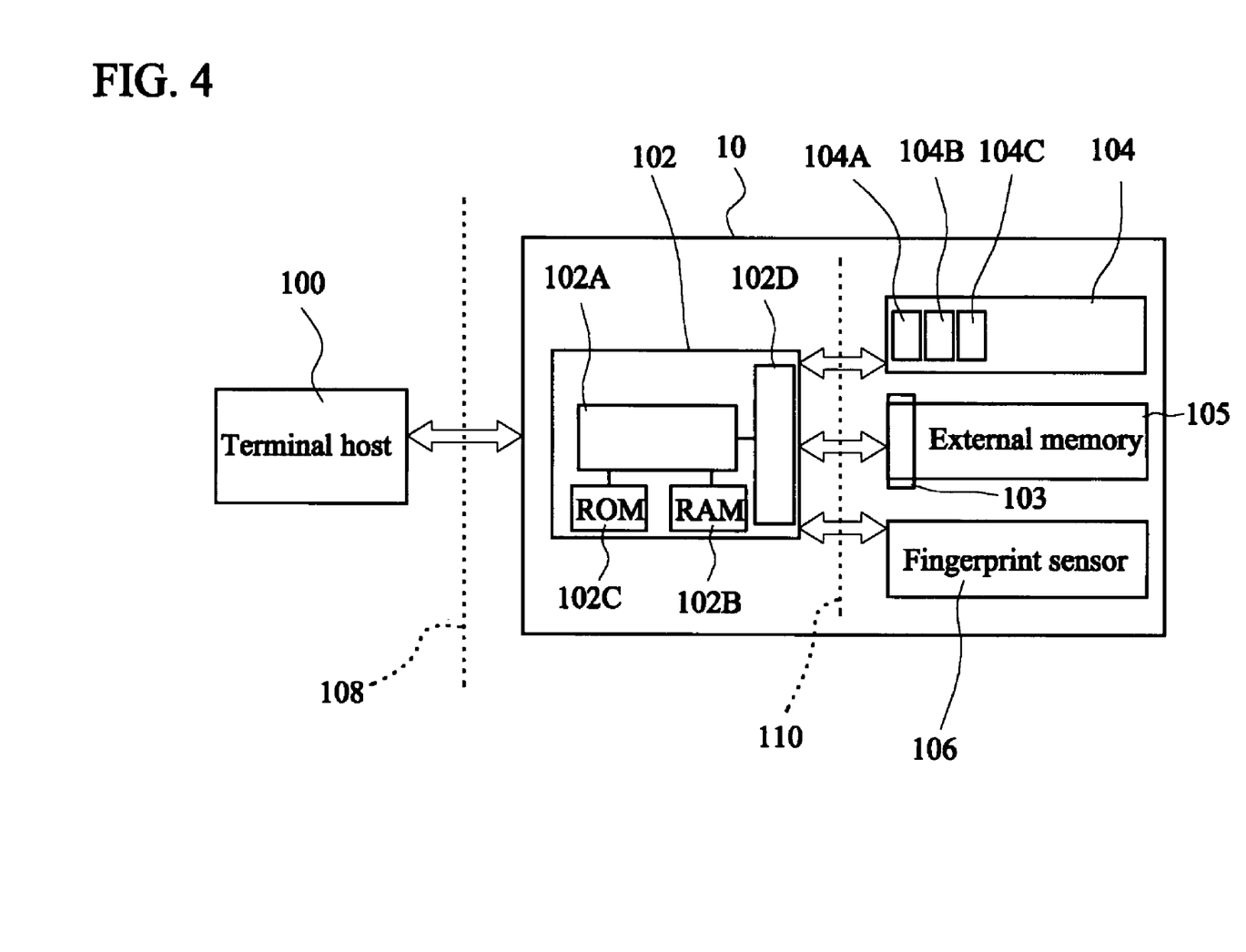
FIG. 4 is a schematic illustration showing a connection state between a terminal host and a storage device according to a second embodiment of the invention.

In another embodiment of the invention, as shown in FIG. 4, the storage device 10 includes the control module 102, the memory module 104, the fingerprint sensor 106 and the host interface 108, which are similar to those of FIG. 1, and further includes a memory expansion slot 103, which substantially expands a memory capacity of the invention device. In this case, the device may be regarded as a memory reader for an external memory 105, such as a CF card, a smart media, a memory stick, other external memories with the standard interface, or a hard disk (particularly a 1-inch or smaller hard disk, which is also referred to as a microdrive). The expansion slot 103 is electrically connected to the control module 102 through the memory interface 110 and is to be electrically connected to the external memory 105 in order to increase the memory capacity of the storage device. When the external memory 105 is inserted into the expansion slot 103, the control module 102 formats the external memory 105 into a single expansion private block for storing additional to-be-protected data. Consequently, this device can provide a method of protecting data in any external memory 105. The encrypting/decrypting device 102D may also encrypt/decrypt the data inputted to or outputted from the external memory 105.

According to the construction of the invention, the connected device viewed from the computer system no longer includes a non-volatile memory and a fingerprint sensor, so it is unnecessary to install the drivers for the non-volatile memory and the fingerprint sensor, and the computer system does not need to control the operations of the devices in the multiplex way. Instead, the connected device viewed from the computer system only includes one portable storage device, so the computer system only has to control the operation of one device. The operations of the non-volatile memory and the fingerprint sensor in the portable storage device may be controlled by the controller. It is to be noted that the controller of the invention may broadly include the devices, such as a ROM and a RAM, for controlling the operations of the non-volatile memory and the fingerprint sensor. In addition, the final minutiae data comparing operation is performed in the control module and the management authority of the memory module exists in the control module, so the device cannot be cracked. The terminal host finishes the most complicated image processing procedure, and the relatively simple minutiae data matching procedure is performed by the microprocessor (e.g., 8051 processor). So, the invention can possess the advantage of the independent device without increasing any cost.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A storage device to be connected to a terminal host, the storage device comprising:
  a host interface to be connected to the terminal host;
  a control module, which is connected to the host interface and comprises a microprocessor, a random access memory (RAM) and a read only memory (ROM), the RAM serving as a working memory for data processing, the ROM storing firmware to make the storage device work and a program code for minutiae data matching;
  a biometrics sensor, which is unremovably connected to the control module, for sensing to-be-recognized biometrics data of a user; and
  a memory module, which is unremovably connected to the control module and divided into:
  a public block;
  a private block for storing to-be-protected data; and
  a hidden block for storing template minutiae data, wherein:
  the control module communicates with the terminal host by handshakes through the host interface and enables the terminal host to automatically run one application program stored in the public block;
  the microprocessor of the control module loads the template minutiae data;
  the terminal host receives an instruction of the user through the application program to inform the control module to control the biometrics sensor to read the to-be-recognized biometrics data of the user and transfer the to-be-recognized biometrics data to the terminal host; and
  the terminal host processes the to-be-recognized biometrics data using the application program to generate to-be-recognized minutiae data, and transfers the to-be-recognized minutiae data back to the microprocessor, and the microprocessor judges whether or not the template minutiae data substantially match with the to-be-recognized minutiae data using the program code, and enables the private block to be accessed by the terminal host when the template minutiae data substantially match with the to-be-recognized minutiae data, or disables the private block from being accessed by the terminal host when the template minutiae data do not match with the to-be-recognized minutiae data.

2. The storage device according to claim 1, wherein the control module further comprises a hardware encrypting/decrypting device for encrypting/decrypting data inputted to or outputted from the memory module.

3. The storage device according to claim 2, wherein the hidden block further stores an encrypting/decrypting key, such that the hardware encrypting/decrypting device encrypts/decrypts the to-be-protected data accessed from the private block according to the encrypting/decrypting key.

4. The storage device according to claim 1, wherein the biometrics sensor is an area-type fingerprint sensor for sensing a fingerprint of a finger stationarily placed on the area-type fingerprint sensor, or a sweep-type fingerprint sensor for sensing a plurality of overlapped fingerprint fragment images of the finger sweeping across the sweep-type fingerprint sensor.

5. The storage device according to claim 1, further comprising:
an expansion slot electrically connected to the control module and to be electrically connected to an external memory such that a memory capacity of the storage device is increased.

6. The storage device according to claim 5, wherein the control module further comprises an encrypting/decrypting device for encrypting/decrypting data inputted to or outputted from the external memory.

7. The storage device according to claim 5, wherein the control module formats the external memory into a single expansion private block for storing additional to-be-protected data after the external memory is inserted into the expansion slot.

8. A method of protecting data stored in a storage device, which comprises: a host interface to be connected to a terminal host; a control module, which is connected to the host interface and comprises a microprocessor, a random access memory (RAM) serving as a working memory for data processing, and a read only memory (ROM) storing firmware to make the storage device work and a program code for minutiae data matching; a biometrics sensor, which is unremovably connected to the control module, for sensing template biometrics data of an authorized user; and a memory module, which is unremovably connected to the control module and divided into a public block, a private block for storing to-be-protected data and a hidden block, the method comprising, after the storage device is electrically connected to the terminal host, the steps of:
enabling the control module to communicate with the terminal host through the host interface, and enabling the terminal host to automatically run one application program stored in the public block; and
entering an enrolling mode or an authentication mode, wherein:
in the enrolling mode:
the terminal host informs the control module to control the biometrics sensor to read the template biometrics data of the authorized user and transfer the template biometrics data to the terminal host; and
the terminal host processes the template biometrics data, generates template minutiae data using the application program, and transmits the template minutiae data to the hidden block for storage; and
in the authentication mode:
the microprocessor of the control module loads the template minutiae data;
the terminal host informs the control module to control the biometrics sensor to read to-be-recognized biometrics data of a user and transfer the to-be-recognized biometrics data to the terminal host;
the terminal host processes the to-be-recognized biometrics data, generates to-be-recognized minutiae data and transfers the to-be-recognized minutiae data back to the microprocessor using the application program; and
the microprocessor judges whether or not the template minutiae data substantially match with the to-be-recognized minutiae data using the program code, and enables the private block to be accessed by the terminal host when the template minutiae data substantially match with the to-be-recognized minutiae data, or disables the private block from being accessed by the terminal host when the template minutiae data do not match with the to-be-recognized minutiae data.

9. The method according to claim 8, wherein the control module further comprises a hardware encrypting/decrypting device for encrypting/decrypting data inputted to or outputted from the memory module.

10. The method according to claim 9, wherein the hidden block further stores an encrypting/decrypting key, such that the hardware encrypting/decrypting device encrypts/decrypts the to-be-protected data accessed from the private block according to the encrypting/decrypting key.

11. The method according to claim 8, wherein the storage device further comprises an expansion slot electrically connected to the control module and to be electrically connected to an external memory so as to increase a memory capacity of the storage device, and the method further comprises the step of:
enabling the control module to format the external memory into a single expansion private block for storing additional to-be-protected data after the external memory is inserted into the expansion slot.

12. The method according to claim 11, wherein the control module further comprises an encrypting/decrypting device for encrypting/decrypting data inputted to or outputted from the external memory.

* * * * *